United States Patent [19]
Uitz

[11] Patent Number: 5,865,315
[45] Date of Patent: Feb. 2, 1999

[54] MATERIAL TRANSPORT SYSTEM

[76] Inventor: Mark O Uitz, 1050 Crest View Dr., Suite C15, Mountain View, Calif. 94040

[21] Appl. No.: 779,211

[22] Filed: Jan. 6, 1997

[51] Int. Cl.[6] .................................................. B65D 19/00
[52] U.S. Cl. ........................................ 206/600; 206/499
[58] Field of Search ................................... 206/386, 600, 206/509, 511, 503, 505, 499; 220/4.28

[56] References Cited

U.S. PATENT DOCUMENTS

| | | | |
|---|---|---|---|
| 2,534,010 | 12/1950 | Frye | 229/23 |
| 4,454,946 | 6/1984 | Yokowo | 206/600 |
| 4,763,787 | 8/1988 | Koenig | 206/420 |
| 4,809,851 | 3/1989 | Destreich, Jr. et al. | 206/600 |
| 5,123,533 | 6/1992 | Uitz | 206/386 |
| 5,267,663 | 12/1993 | Dykhouse | 220/4.28 |
| 5,323,911 | 6/1994 | Johnston et al. | 206/600 |
| 5,417,034 | 5/1995 | Gabler et al. | 53/399 |
| 5,454,962 | 10/1995 | Uitz | 206/511 |
| 5,555,980 | 9/1996 | Johnston et al. | 206/386 |
| 5,730,295 | 3/1998 | Darby | 206/600 |

*Primary Examiner*—Jacob K. Ackun
*Attorney, Agent, or Firm*—Flehr Hohbach Test Albritton & Herbert LLP

[57] ABSTRACT

A material transport system is described made up of a pallet and a container. Both the pallet and the container are reusable, with the container being collapsible for shipping. A plurality of the containers are furnished in their collapsed form to a material handler, along with pallets for use with such containers when they are erected. Lids for the erected containers are also provided to the material handler. When the containers are provided to the material handler in their collapsed condition along with lids, they are provided on a specialized pallet. All aspects of the material transport system are made from a plastic and can be recycled at the end of their useful life.

19 Claims, 12 Drawing Sheets

MATERIAL TRANSPORT SYSTEM

BACKGROUND OF THE INVENTION

The present invention relates to the packaging of commodities and, more particularly, to a containerization approach providing a reusable, full handling arrangement for commodities.

Many commodities (produce, other types of fresh fruit and vegetable products, some packaged goods such as cereal boxes, loose pieces of goods such as bolts, etc.) are packaged together for handling. These handling packages may be somewhat specialized. For example, many items of produce are packed in wooden crates in a field for handling and transportation. Such crates are then palletized to form a full handling unit, and the unit is shipped to the destination for the packed commodity. Because of waste disposal/landfill problems associated with such packaging, etc., some rely on reusable plastic containers to provide the packaging. Many of such containers are collapsible. Such containers when erected can hold the commodities and yet be collapsed when empty to facilitate container handling. A reusable, collapsible plastic container particularly useful in the instant invention is described in U.S. Pat. No. 5,450,962.

It is common to palletize commodity containers, e.g., the fruit and vegetable wooden boxes are often shipped when full on pallets. This is also true of reusable collapsible plastic containers. That is, the containers are placed on pallets when erected for the shipping or other handling of the commodities. In most arrangements such pallets are of wood and are not reusable. Even though the plastic container itself may be collapsed and/or reused, the waste disposal/landfill problems still exist in view of the pallets. While there are plastic pallets, insofar as applicant is aware there is no full arrangement for handling commodities where all major parts are recyclable or reusable.

SUMMARY OF THE INVENTION

The present invention provides a full handling procedure and arrangement for commodities to be packaged. From the broad standpoint the method includes not only furnishing the handler with a plurality of collapsed plastic containers for the products, but also separately furnishing to such handler one or more plastic pallets configured to hold a stack of such plastic containers when such containers are erected and filled with the commodity to be handled. Preferably, the containers are furnished to the handler, e.g., a grower, nested together in their collapsed condition on a pallet that is specially designed to hold a plurality of such collapsed containers. Lids for the containers are also furnished to the handler on the specialized pallet. As will be clear from the discussion below, the design of the containers/lids is such that the lids are separated from one another so that an individual lid is associated with each collapsed container.

The specialized pallet for collapsed containers is different than the pallets furnished to the handler for use with stacks of erected containers. In other words, there are two different pallets, one for the containers when they are collapsed and one for the containers with lids when they are in their erected condition. Separate interface structure is provided for the containers on each of these pallets. In a preferred arrangement and to reduce expenses, the two pallets are essentially of the same construction, except for such interface structure.

As another major feature of the invention, the plastic container is configured with interface structure that is complementary to interface structure provided on the pallets. Moreover, in the preferred arrangement each container and both of the pallets are of plastics which can be recycled. That is, after a specific pallet and/or container is no longer reusable, it can be recycled. If it is desired to make a new pallet from plastic to be reused, in the preferred arrangement it does not matter if the plastic originally had been part of a container incorporated in the invention—the plastic used for the collapsible containers and that used for the pallets is the same.

Other features and advantages of the invention either will become apparent or will be described in connection with the following, more detailed description of a preferred embodiment of the invention and variations.

BRIEF DESCRIPTION OF THE DRAWING

With reference to the accompanying drawing.

DETAILED DESCRIPTION OF THE PREFERRED EMBODIMENT(S)

The following relatively detailed description is provided to satisfy the patent statutes. It will be appreciated by those skilled in the art, though, that various changes and modifications can be made without departing from the invention.

Figure 1:
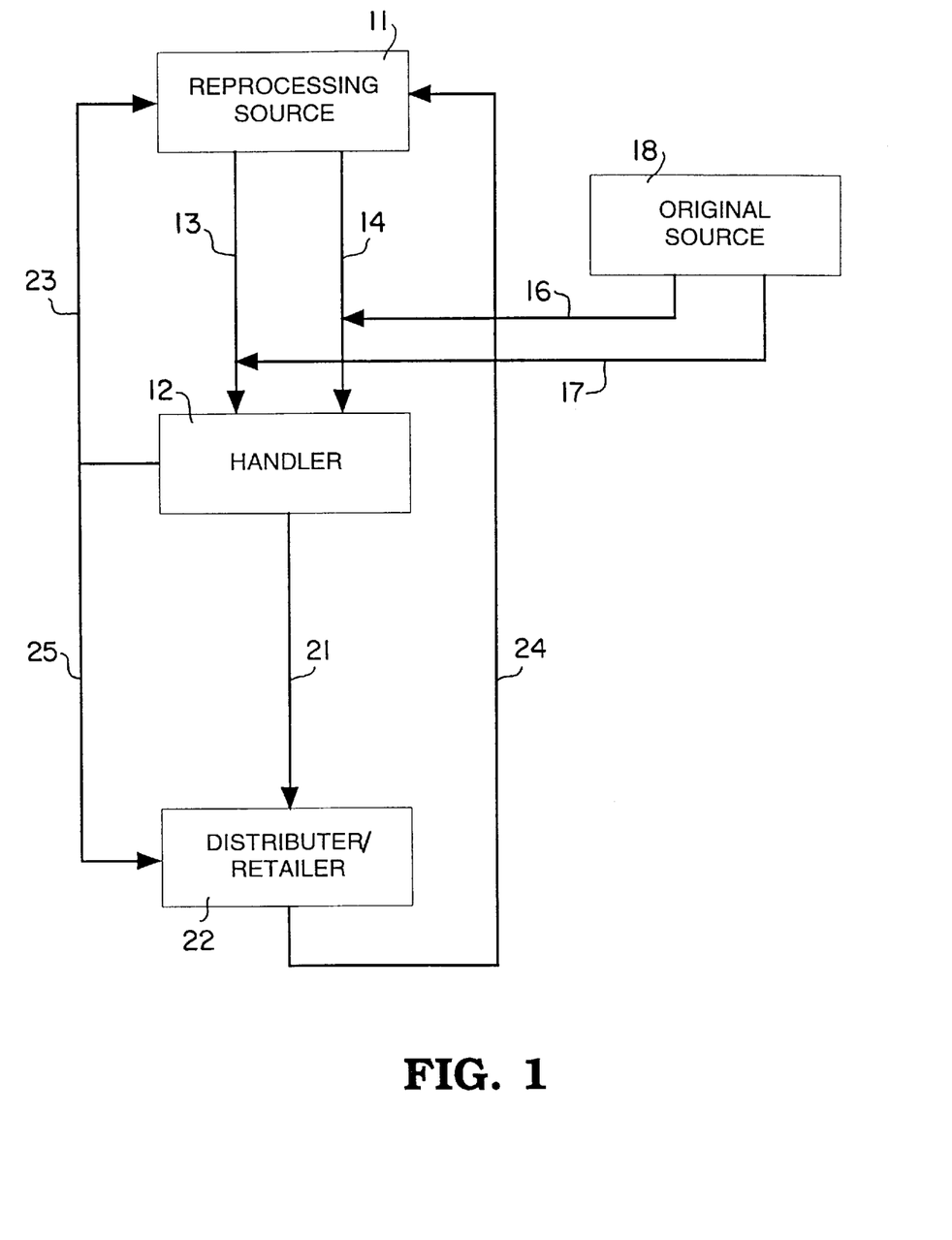
FIG. 1 is a simplified flow diagram provided to facilitate an understanding of the invention.

Most of a method of the invention will be easily understood from FIG. 1. Cleaned and sterilized containers are furnished to a handler by a reprocessing source 11. A plurality of such reprocessing sources are preferably located at various strategic locations.) The handler (which might be a grower of produce) is represented in FIG. 1 by block 12, and furnishing of the collapsed containers to the handler is represented by flow line 13. As will be discussed in more detail below, the collapsed containers are furnished to the handler in a nested stack on pallets having interface structure especially designed to interlock with such stacks. As also will be discussed in more detail below, lids for the containers when they are erected are part of the assembly furnished to a handler on the special pallets. Moreover, a top frame (to be discussed) is also provided to aid in holding nested stacks of collapsed containers/lids on a pallet.

In keeping with the broad nature of an aspect of the invention, reprocessing source 11 also furnishes the handler with pallets which can be used with the containers once they are erected. This is represented in FIG. 1 by flow line 14. These pallets differ from the pallets mentioned earlier primarily in that they have interface structure designed to interact with erected containers, rather than interface structure for nested collapsed containers.

In some instances, it will be necessary to furnish the handler with new (rather than reprocessed) containers in their collapsed condition. It may also be necessary to furnish the handler with new pallets and top frames for the erected containers. Flow lines 16 and 17 are included in FIG. 1 extending from a block 18 labeled as the "ORIGINAL SOURCE" to represent the furnishing of these new items.

It will be recognized that to initiate the cycle new containers and pallets for erected containers must be provided to the handler from an original source(s). It also will be recognized that although not described the plastic used by the original source to make the new pallets preferably is obtained in whole or in part by recycling used or damaged containers. In this connection, it will be recognized although not shown by flow lines that damaged pallets or containers which are not to be reused are returned for recycling to an original source(s). It is foreseen in one implementation of the invention that containers generally will not be unusable and need to be recycled until after approximately 60 uses.

The handler erects the containers, fills them with the commodities to be handled, and then uses the erected container pallets to furnish the filled containers to the next entity in the commercial chain. This is represented in FIG. 1 by flow line 21 extending to a block 22 labeled in the figure "DISTRIBUTOR/RETAILER". Since the handler will have no use for the collapsed container pallets, such pallets will be returned to a reprocessing source, typically the nearest one. This flow is represented in FIG. 1 by flow line 23.

The distributor/retailer may leave the commodities in erected containers stacked on the pallets for ease in further distribution. The entity that removes the commodities from the containers will collapse the containers and place them on the pallets designed for the collapsed containers. The reprocessing source will collect the collapsed containers. This procedure is represented by flow line 24.

The delivery to the distributor of pallets for the collapsed containers is represented by flow line 25. Although such flow line is shown emanating from the handler block, it is to be appreciated that in most instances the specialized pallets for the collapsed containers will be furnished by the reprocessing source. In this connection, it is the reprocessing source that has the major responsibility in this closed loop flow. Although in some instances it may be necessary that new specialized pallets for collapsed containers be added to the chain, it will not be a common occurrence and a good place for the same would be for such new collapsed-container pallets to be delivered to the distributor/retailer.

The reprocessing source will clean and sterilize, as appropriate, the collapsed containers returned to it. For example, it may clean the containers in accordance with the method covered by U.S. Pat. No. 5,573,599. The containers are then palletized in their collapsed condition and furnished with pallets for erected containers to a handler—that is, in accordance with an aspect of the invention the handler is provided with a complete commodity handling arrangement.

One of the major benefits of the invention will be recognized from the above. That is, the container/pallet system of the invention lends itself quite well to the intermixing of commodities. For example, the invention can be used to ship, let's say, grapes from one location to another, be collected and processed at the second location for shipment of a different commodity to a third location, and collected and processed again at the third location for reuse to ship another product to a fourth location.

Figure 2:
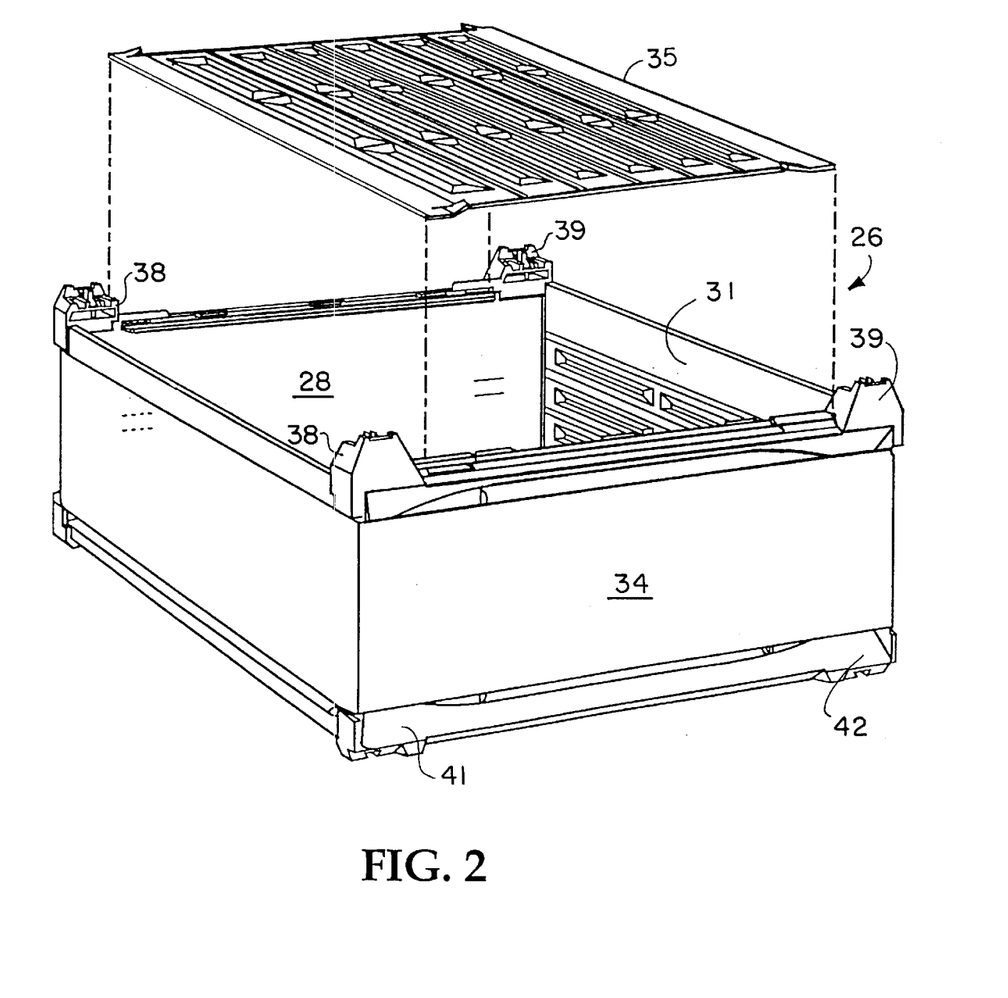
FIG. 2 is a pictorial view of a container of the type incorporated into the invention, in its erected condition and with a lid for the same exploded away.
Figure 3:
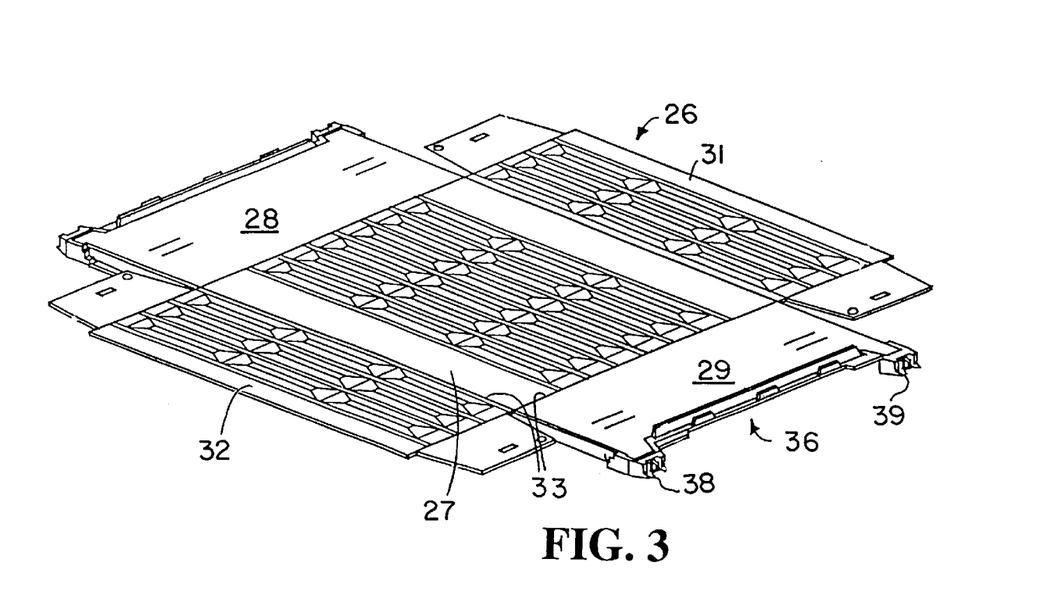
FIG. 3 is a pictorial view of the container of FIG. 2 in its collapsed condition.
Figure 3A:
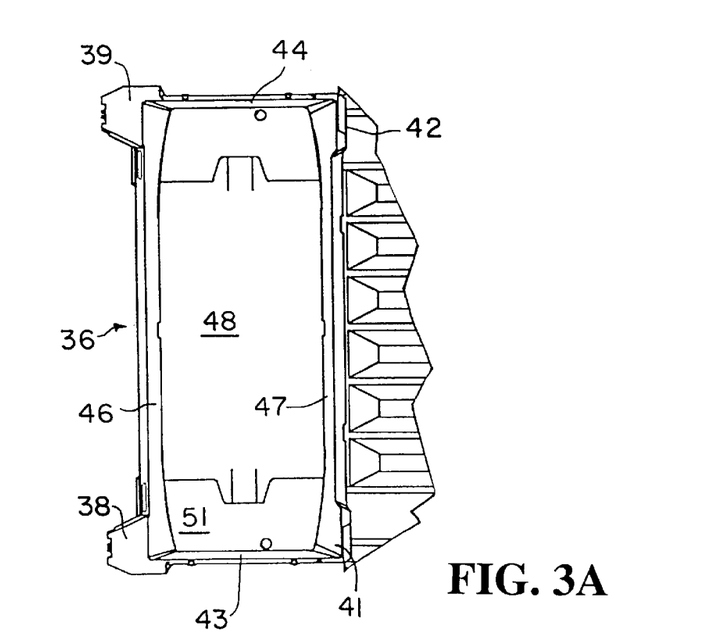
FIG. 3A is a partial plan view of the reverse side of the end wall of a container of the type incorporated into the invention.

As mentioned previously, the preferred embodiment of the invention is particularly designed to make use of a container conforming to the collapsible, plastic container of U.S. Pat. No. 5,450,962, the subject matter of which is incorporated by reference. Reference is made to FIGS. 2, 3 and 3A for a description of those aspects of the container important to this invention. Such container, generally referred to by the reference numeral 26, includes a bottom wall 27, a pair of end wall structures 28 and 29 and a pair of side wall structures 31 and 32. In this connection, the whole structure (except for the structural end frames to be discussed) is made as a one-piece extruded plastic shell, preferably from polypropylene (PP). (It is to be noted that the shell is embossed when it is extruded to provide additional strength without adding weight or additional thickness.) A band of material 34 circumscribes the walls holding all of the same together to form a container cavity with the bottom wall when the container is in its erected condition as shown in FIG. 2. Printing or the like showing a grower's logo, the contents of a container, etc., can be included at appropriate locations on the band. A lid 35 is also included for use with the container.

Each of the end and side wall structures is connected to its associated edge of the bottom wall 27 by a hinge 33 made of plastic. That is, the plastic at the junctions netween the walls and the bottom edges is made thinner so as to permit the walls to be moved between the two positions shown in FIGS. 2 and 3. It should be realized that the technique of making such hinges from plastic is quite advanced, and hinges can be provided which can be cycled many times without adverse consequences.

The container end walls 28 and 29 have a relatively rigid frame 36, and FIG. 3A is the reverse side of an end wall structure showing one of these frames. The purpose and function of such an end frame should be understood for a basic understanding of the invention. The frames 36 are the main structural members which take the vertical load when the containers are stacked. Essentially all of the remainder of each container is simply an extruded shell designed to have the strength necessary to hold the commodity to be packed but not necessarily to take the load of stacked containers. That is, the bottom wall 27, the portions of the end wall 28 and 29 designed to be against the commodity and shown in FIG. 3, and the side walls 31 and 32 simply form a shell which is supported, for stacking, by the rigid end frames 36.

Each end frame is made from the same plastic material as the shell. However, each end frame is an injected molded, structural foam part. In this connection, appropriate energy directors are provided in the frame's design to facilitate welding. The end frames are respectively welded via, for example, vibration welding, to the outside surface of the extruded part of each end wall.

Each end frame 36 is made up of upper end posts 38 and 39 and bottom end posts 41 and 42. Vertical elongated frame bars 43 and 44 respectively structurally connect the upper end posts 38 and 39 with the lower end posts 41 and 42. Upper and lower horizontal frame bars 46 and 47 are also provided. As described in U.S. Pat. No. 5,450,962, each end frame further includes a filler plate or panel 48 and end plates 49 and 51.

The collapsed containers correspond to the one illustrated and described in the previously mentioned patent. These containers are provided in different sizes, including different depths. Thus, in some instances it is required that the side panels include flaps or the like which can be folded over for use with the specialized pallets. Also, the ends 28 and 29 of the containers may be elongated to cooperate with the elongated sides. (In some instances, the dimensions of the pallets are selected to accommodate dimensioned containers.)

Figure 4:
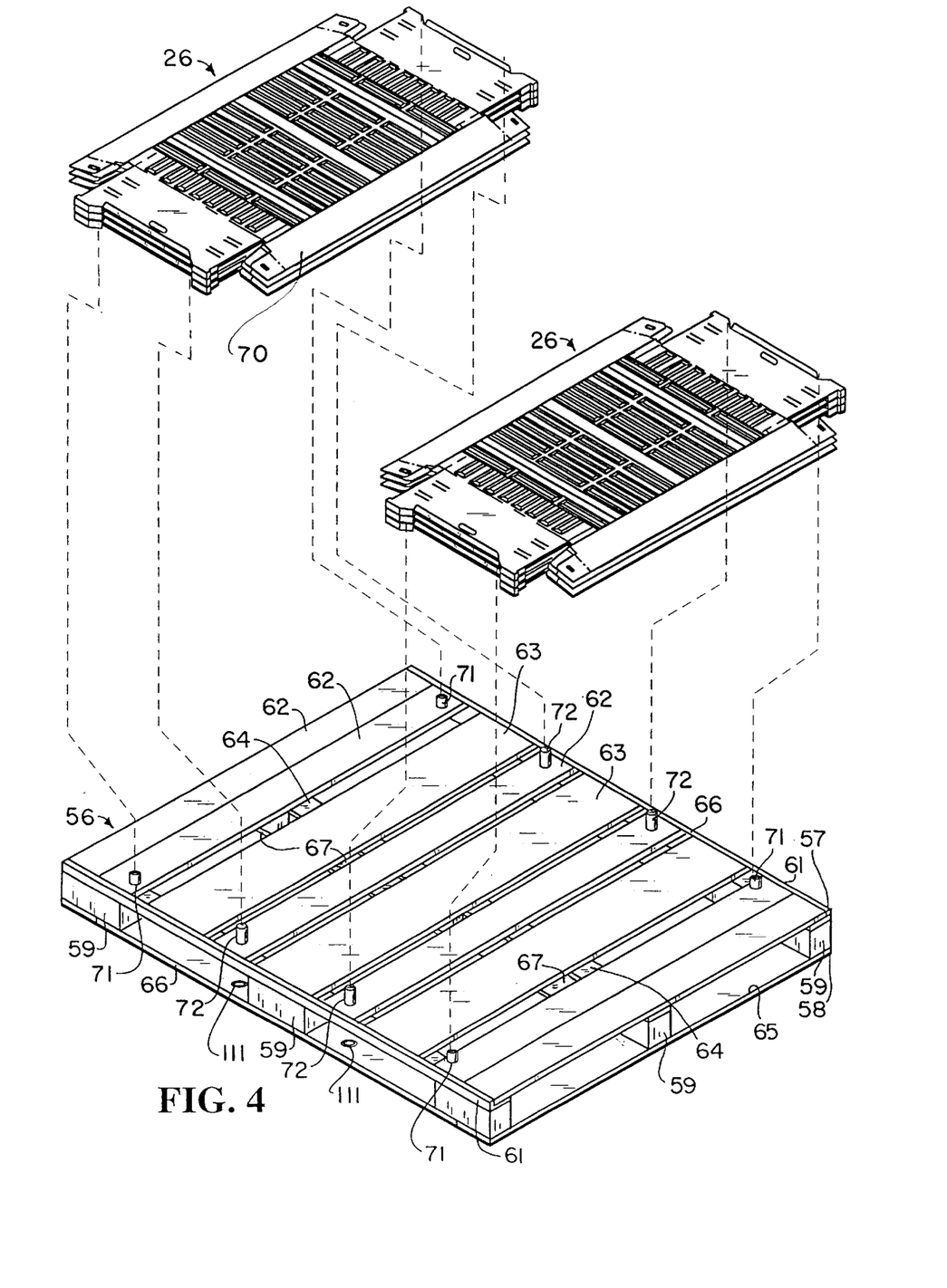
FIG. 4 is an exploded pictorial view illustrating the manner in which in the preferred embodiment of the invention the containers are furnished to handlers.

As mentioned previously, containers 26 are shipped in their collapsed condition on specialized pallets. FIG. 4 illustrates such a pallet and the manner in which two stacks of collapsed containers interface with the same. This pallet, generally referred to in FIG. 4 by reference numeral 56, is essentially made up of a plurality of parts that are extruded. Many of the parts are the same as others so that common pieces of extruded stock can be used. It is made up of a top deck section 57 spaced from a bottom deck section 58 by spacer blocks 59. The top deck section is provided to support the load (in this instance, the collapsed containers) whereas the bottom section is provided for interaction with a supporting surface, such as the ground or a floor. The spacer blocks 59 define channels between the decks for receipt in accordance with conventional practice of pick-up tines of a forklift or the like.

The top deck section 57 includes a pair of spaced apart edge boards 61 which connect the ends of a plurality of cross slats 62 and 63. It also includes a cross bar 64 which extends parallel to the edge boards 61 along the center of such deck section beneath the slats 62 and 63. The edge boards 61, all of the slats 62 and the cross bar 64, and all of the slats 63 respectively can be made from common pieces of extruded stock.

The spacer blocks 59 are all of the same configuration with the result that they also may be formed from the same extruded stock. The bottom deck is a frame made up of a pair of end bars 65 (only one of which is shown) at the opposed ends of the pallet underneath the outer ones of the cross slats 62 of the top deck section. These end bars are connected by edge slats 66 and a center slat 67. The bottom deck end bars 65 and the slats 66 and 67 also preferably coincide in configuration to the cross slat 62 of the top deck section and can be cut from the same stock as such top deck slats.

The pallet 56 includes interface structure for interfacing with a pair of stacks of collapsed containers. These containers are of the increased depth variety and, in this connection, include folded over flaps 70. The interface structure includes a plurality of posts 71 and 72. The dotted lines in FIG. 4 illustrate the positioning of such posts relative to stacked collapsed containers. As shown, these posts 71 and 72 are spaced at an appropriate distance from one another to accommodate the collapsed containers with the container ends captured by such posts. (It should be noted that the posts 72 project upwardly beyond their associated slats a greater extent than the posts 71.)

Figure 5:
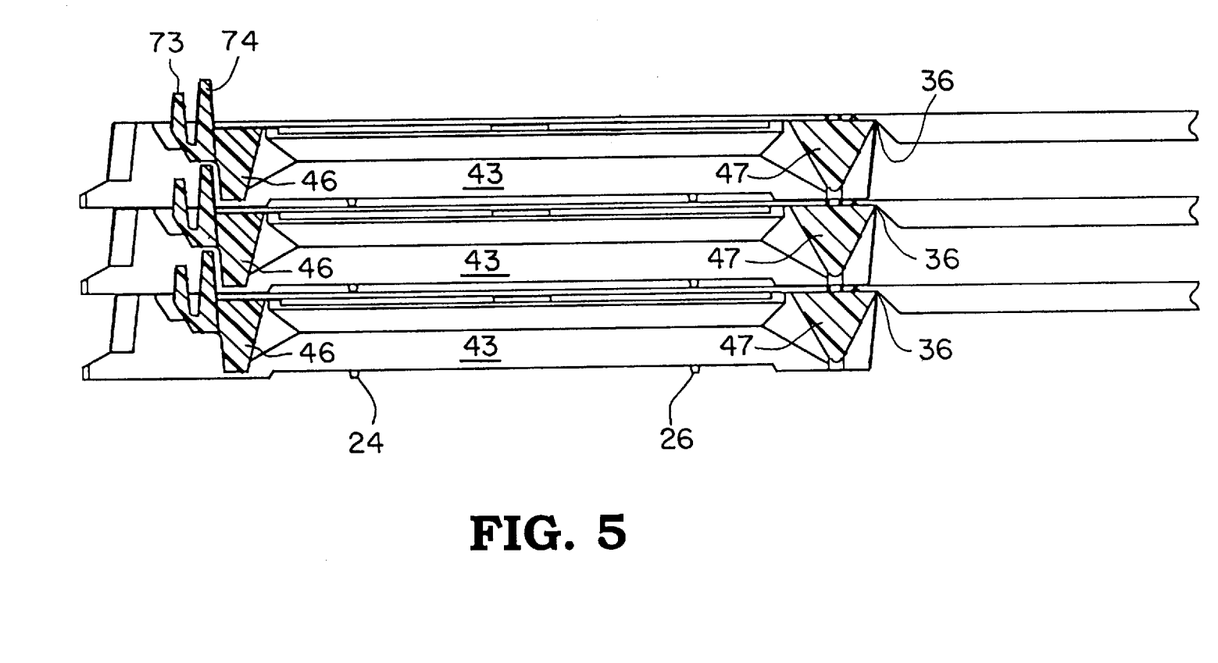
FIG. 5 is an enlarged partial sectional view illustrating the manner in which collapsed containers nest with one another.

As mentioned previously, the containers when collapsed are nested together on the pallet 56. They are nested with lids for each. It is the end frames 36 of each which nests with the end frames of others. FIG. 5 is an enlarged view showing such nesting. As illustrated and discussed in the aforementioned patent, each end frame has a pair of lips 73 and tits 74 which protrude into its neighbor to aid in maintaining the position of each flattened container relative to its adjacent one, i.e., they prevent relative transverse movement between such adjacent collapsed containers.

Figure 6:
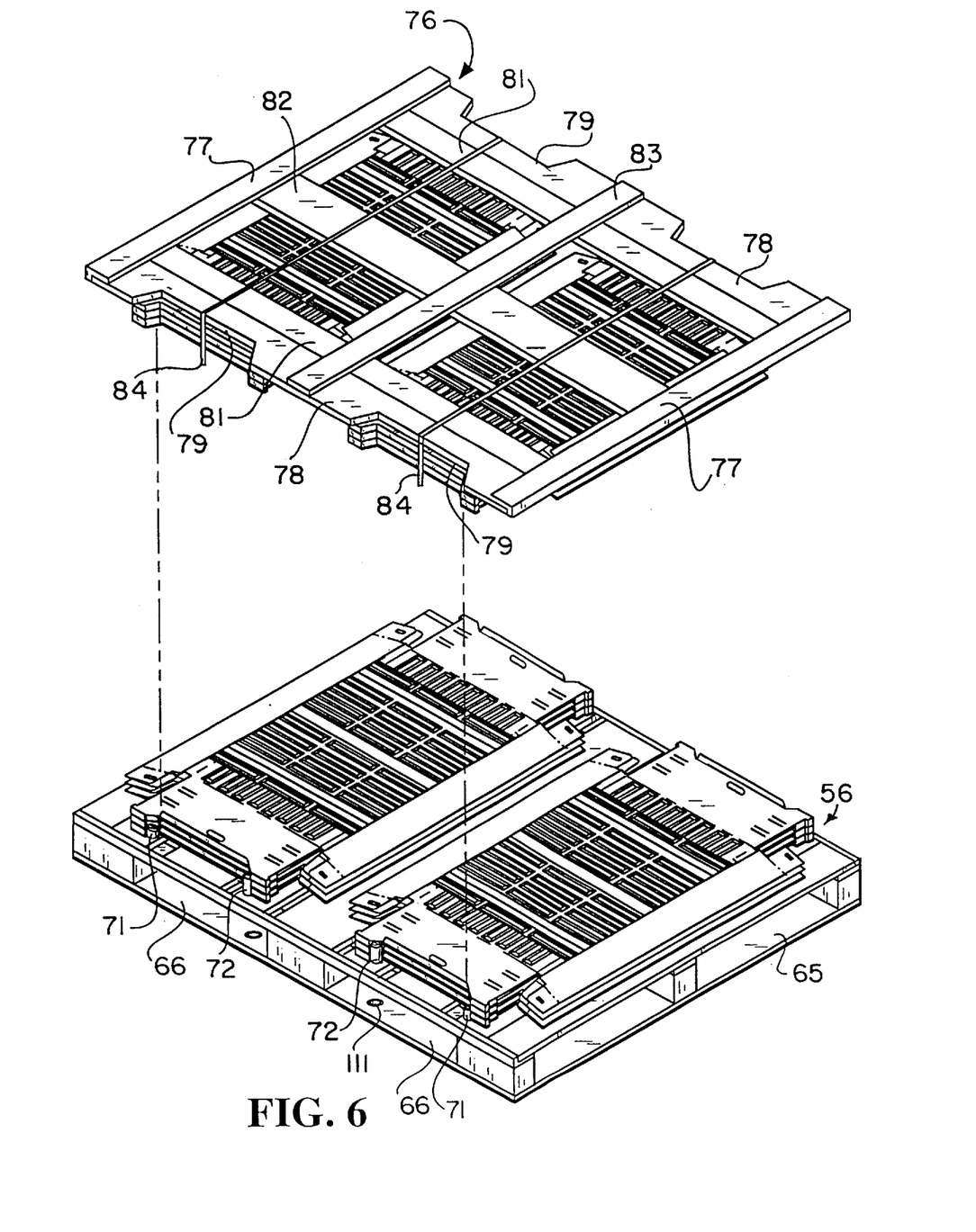
FIG. 6 is an exploded isometric view illustrating in more detail the manner in which the containers are furnished to a handler in their collapsed condition.

The stacks of container-lid combinations are held in position on the pallet 56 by a top frame 76. (See FIG. 6.) Such top frame is made up of opposed end boards 77 connected by edge rails 78. Each of the boards 77 has the same cross sectional configuration as the edge board 61 of the pallet 56. However, although the rails 78 have a width similar to the width of cross slats 62 of the pallet, they are not formed from the same stock as such cross slats. Each rail 78 is formed from a solid piece of stock whereas the slats 62 have a webbed interior. The notches 79 in the end rails correspond to the configuration of the underlying portion of the collapsed containers. Each end of the top frame 76 further includes a pair of strengthening rails 81 which do correspond in cross section to the slats 62. These rails add the structural integrity to the top frame that is "lost" by the provision of the notches 79. The top frame construction is completed by a center slat 82 which crosses a center board 83. Center slat 82 has the same cross sectional configuration as cross slat 63 of the pallet, whereas board 83 has the same cross sectional configuration as pallet cross slats 62.

Figure 7A:
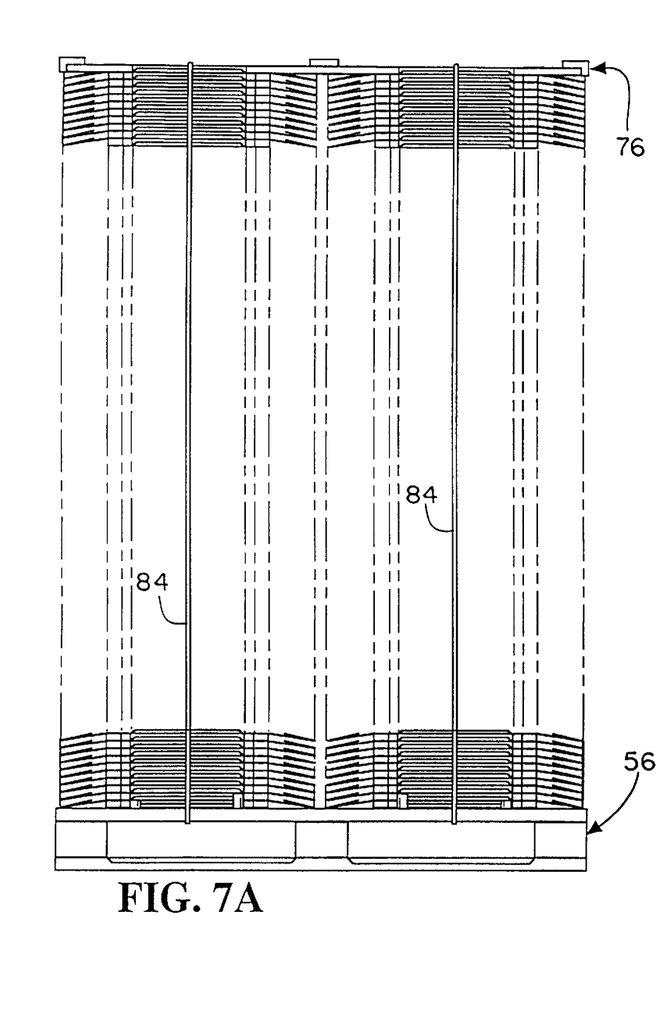
FIG. 7A is a front view of a load (with pallets and top frame) of the containers in their collapsed condition.
Figure 7B:
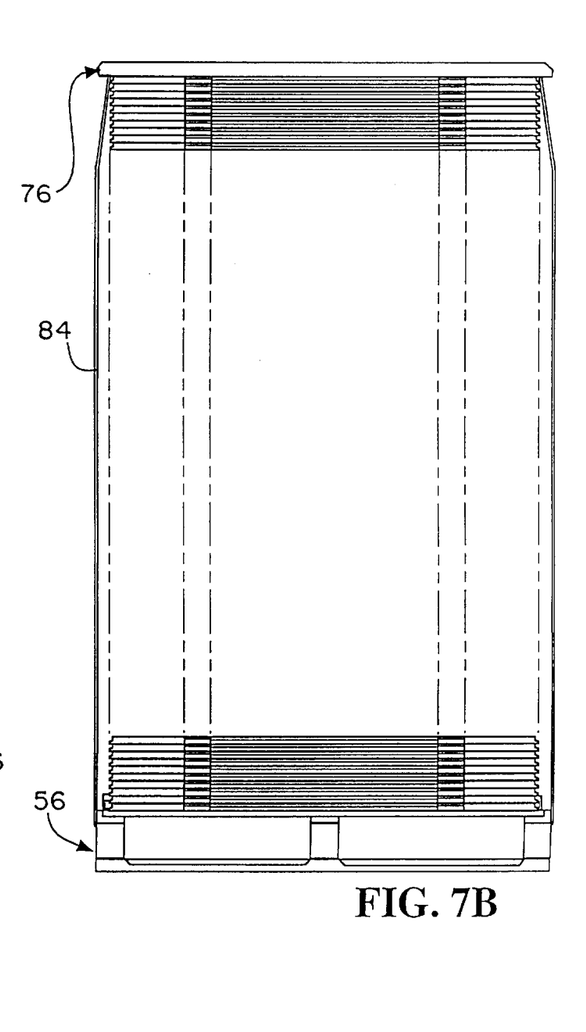
FIG. 7B is a side view of the arrangement illustrated in FIG. 7A.

The assembly of collapsed containers is completed by a pair of straps 84 which surround the top frame, the underlying collapsed containers and the pallet. FIGS. 7A and 7B are respectively front and side views showing the palletized, collapsed container-lid combinations provided to the handler.

Figure 8:
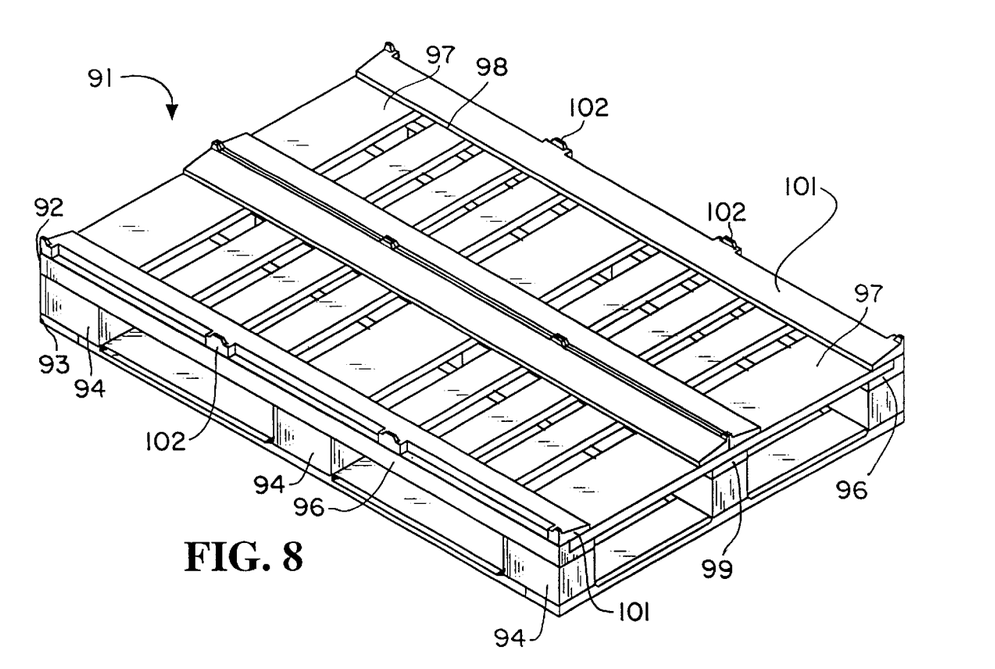
FIG. 8 is a pictorial view of a pallet which interlocks with an erected container.

As mentioned previously, the handler is provided not only with the container-lid combinations in the container collapsed condition, but also with a supply of pallets to be used with the containers once they are erected. FIG. 8 shows one of such pallets. This pallet, generally referred to by the reference numeral 91, also includes a top deck section 92, a bottom deck section 93 and spacer blocks 94. Except for the container interface structure, this pallet is quite similar to pallet 56. The top deck section includes edge boards 96 which in cross sectional configuration are the same as edge board 61 of pallet 56. It further includes end boards 97 and cross slats 98 which respectively are cut from the same stock as that used to make slats 62 and 63 for the other pallet. This top deck section also includes a center board 99 which extends parallel to the edge boards 96 along the center of the cross slats. Such center board has the same cross sectional configuration as the slat 62 of the other pallet so that it also can be cut from the same stock as such slat. The spacer blocks 94 of pallet 91 are the same as, and similarly positioned as, the spacer blocks 59 of pallet 56.

The interface structure on pallet 91 is designed to interact with the containers when they are in their erected condition. That is, pallet 91 has container cleat runners 101 adjacent each of its edges. Two of the runners are also placed back to back as illustrated along the center of the pallet parallel to the edge cleat runners. All of the cleat runners are vibration welded or otherwise secured in place.

It will be seen that two rows of erected containers can be accommodated by each pallet. Each runner 101 provides upstanding cleats 102 to engage the bottom edges of the containers. In the embodiment being described, the runners are relieved to provide such cleats, i.e., some of the extruded material is removed.

It should be noted that in those instances in which it is expected the pallet 91 will be used with containers other than containers having interfacing structure, the runners 101 will not be included. The pallet is then easily usable as a standard pallet for shipping, for example, cardboard boxes or containers, or containers made from a plastic or composite. It may be desirable in some instances to include other special interfacing structure on the pallet.

Figure 9A:
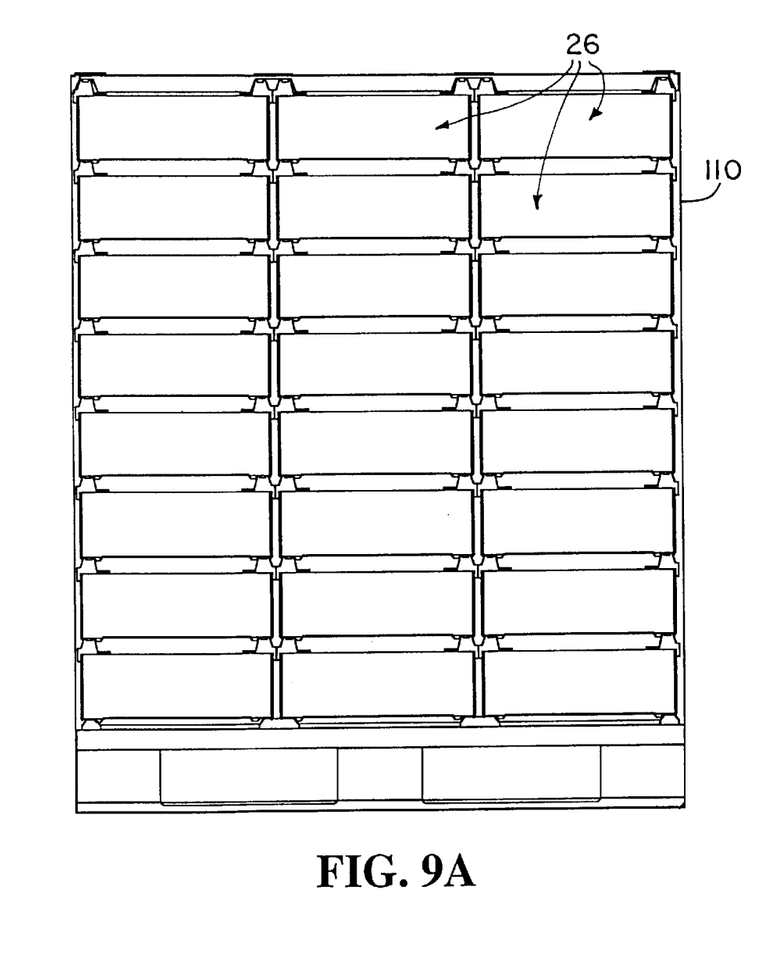
FIG. 9A is a front view of a plurality of stacks of the containers in their erected condition mounted on a pallet.
Figure 9B:
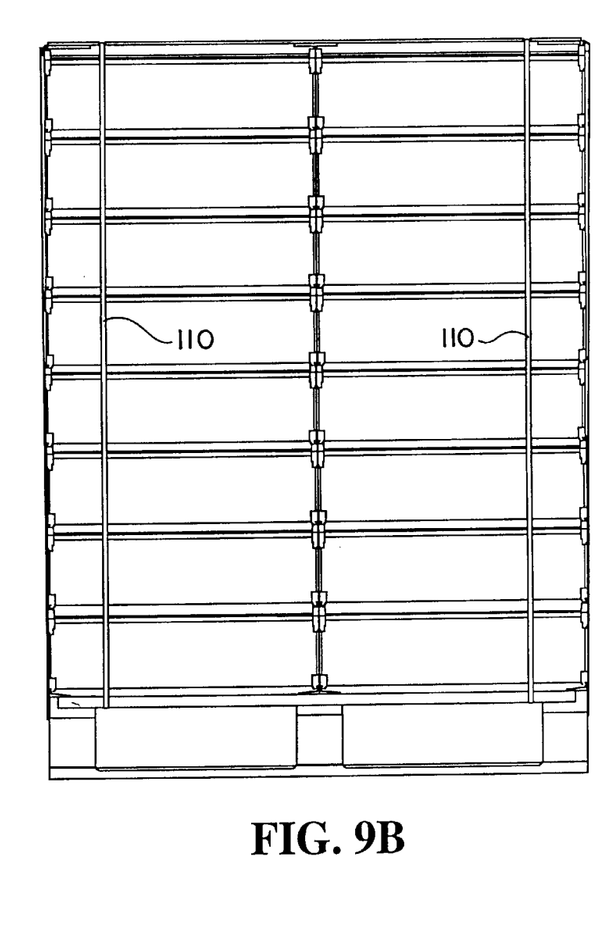
FIG. 9B is a side view of the arrangement shown in FIG. 11A.

When erected containers are stacked, it is the container posts 38, 39 and 41, 42 of the adjacent containers which interface for interlocking. This complementary interlocking is best illustrated in FIGS. 9A and 9B. The upper posts 38, 39 of each row of containers engages within the posts 41, 42 of the next adjacent row to provide the desired interlocking. The pallet cleats 102 duplicate, in essence, the upper posts found on containers. Thus, the first row of containers is held in position on the pallet by the interface structure discussed above.

A top frame 103 is also provided for interaction with the erected-container pallet to aid in holding stacks of erected containers on the pallet for shipping and handling. It is shown in detail in FIG. 10, and includes a pair of L-shaped end boards 104 which capture the upper ends of the containers, which boards are relieved as shown to accommodate the posts 38 and 39. These boards not only interact with the posts 38 and 39, but also with the remainder of the upper portions of the frames to lock the containers in position.

Figure 10:
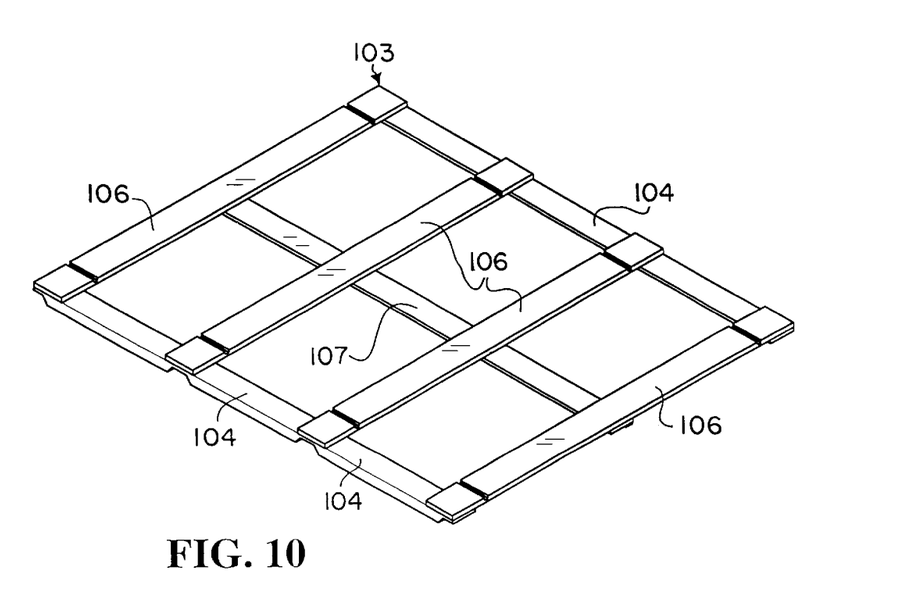
FIG. 10 is a pictorial view of a top frame which is designed to cooperate with a pallet shown in FIG. 8 to hold a plurality of erected containers on such pallets.

End boards 104 are connected by slats 106, and a enter board 107 is provided that is relieved as is appropriate to accommodate and capture the posts projecting from the upper containers. One purpose of the top frame is to facilitate stacking of erected-container and pallet combinations. In this connection, center board 107 not only captures posts projecting from the upper containers of a stack, it also assures that the stack is generally flat to facilitate the stacking of the combinations.

Figure 11:
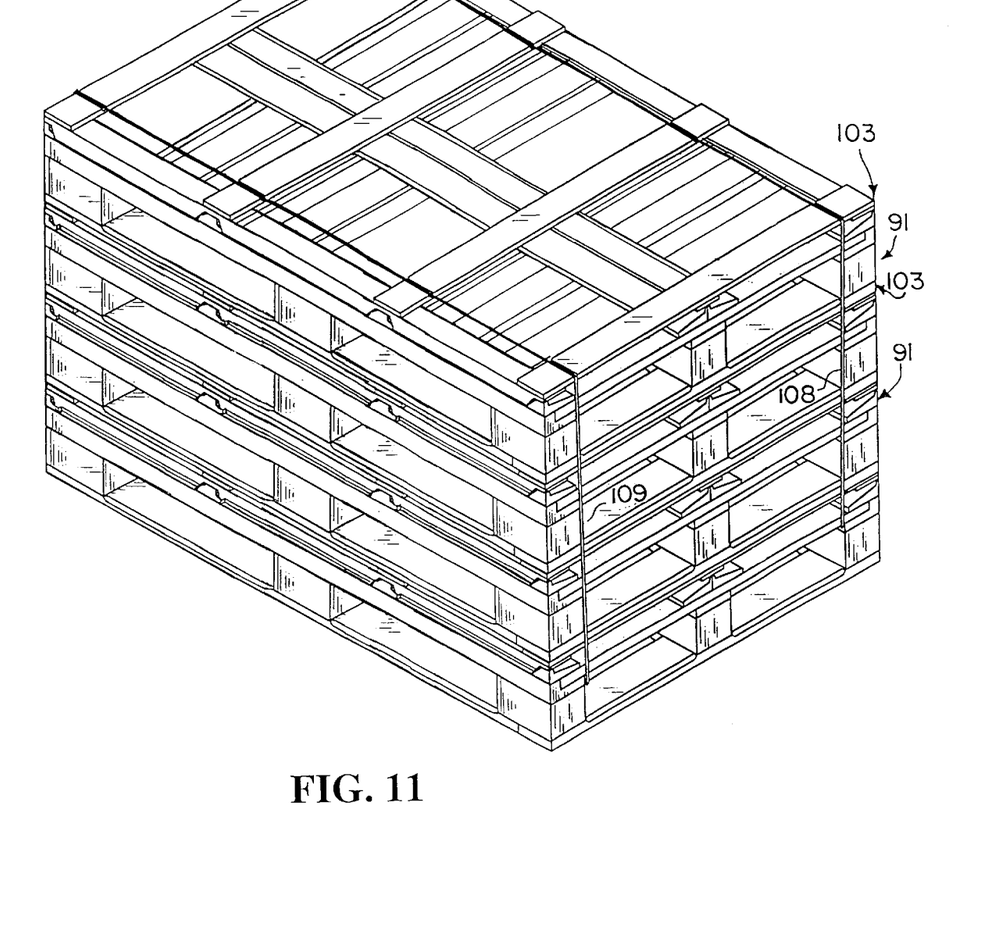
FIG. 11 is a pictorial view of the manner in which the pallets for the erected containers are separately furnished to a handler in accordance with a preferred embodiment of the invention.

The pallets 91 and the top frames 103 are provided in a stacked arrangement as is illustrated in FIG. 11 when they are furnished to the handler at the same time the collapsed containers are furnished to him/her. The pallets and top frames are alternated as illustrated, with the result that pallet/top frame combinations are provided for the handler. It should be noted that the cavities provided in the top frames are complementary to the cleats 102 on the pallets. Moreover, the stack is held together by bands 108 and 109. The slats making up the top frame are appropriately grooved to receive such bands as is illustrated. These grooves are also usable to position bands 110 when the pallets 91 and top frames 103 are used to palletize erected (and probably filled) containers 26.

Figure 12:
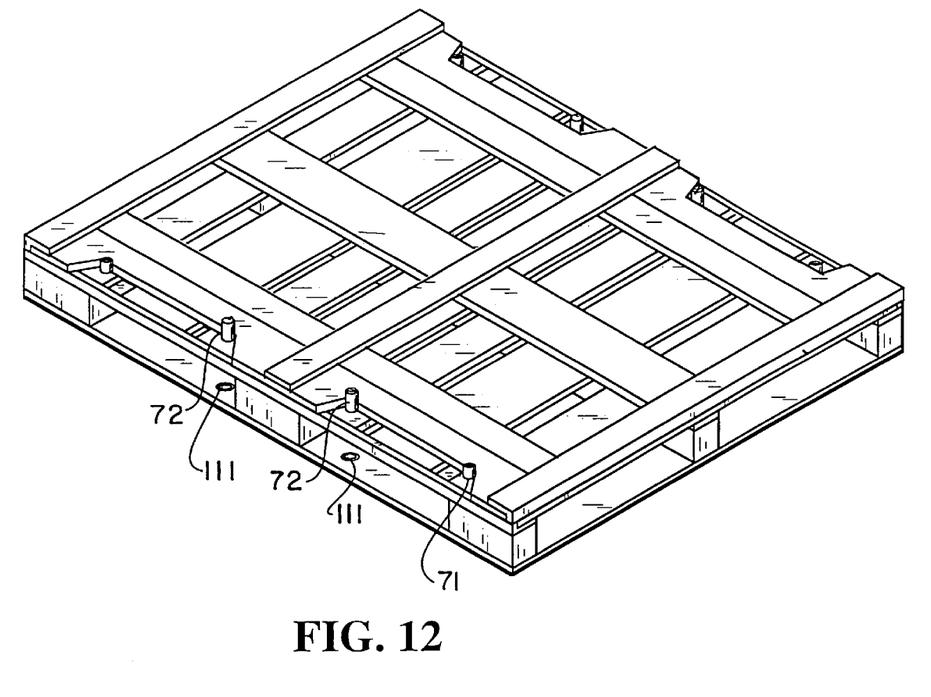
FIG. 12 is a pictorial view of an assembly of a pallet and its top frame used to transport containers when such containers are in their collapsed condition.
Figure 13:
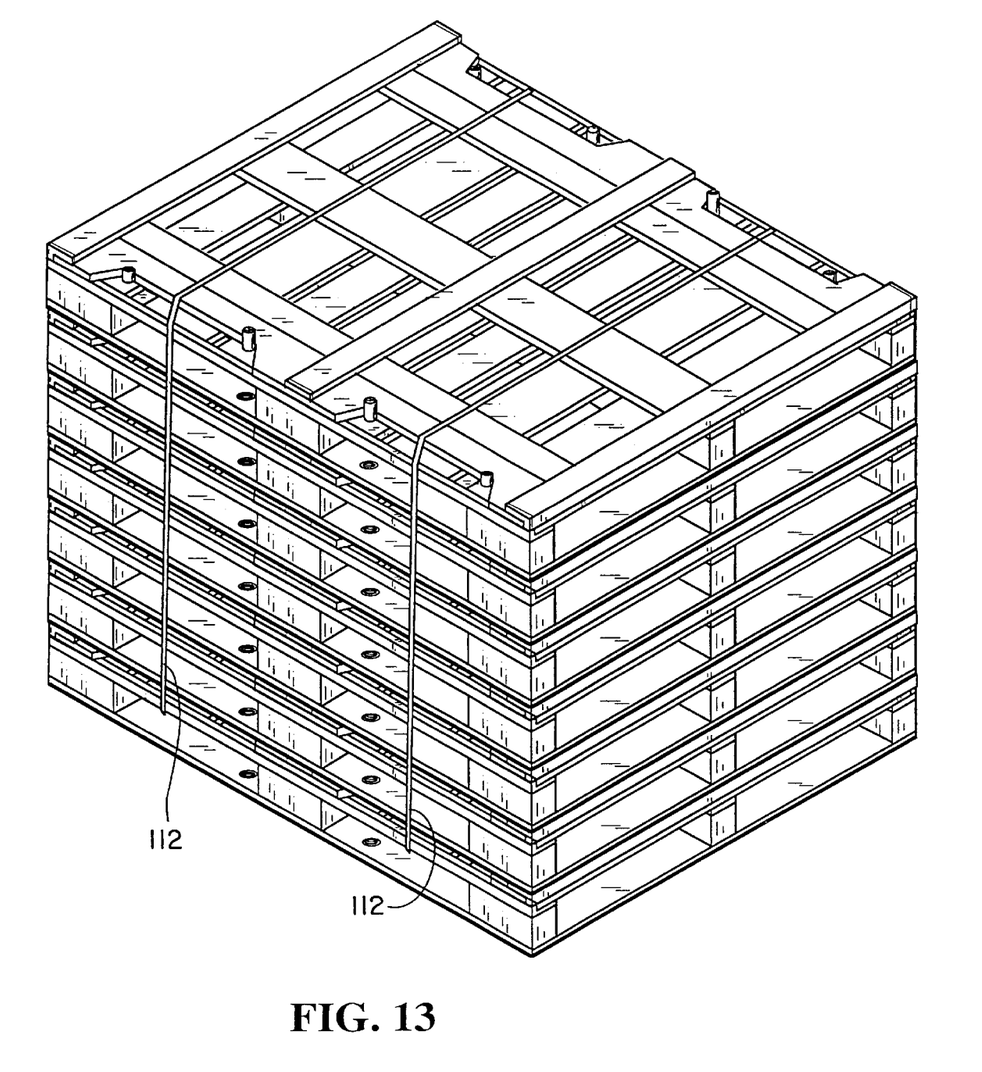
FIG. 13 is a pictorial view of a stack of the pallets and top frame arrangements of FIG. 12, held together for transportation.

As mentioned previously, it is desirable that the pallets and top frames used with collapsible containers be returned or picked up by the reprocessing source. In this connection, such pallets and their top frames nest together to facilitate such returning. FIGS. 12 and 13 illustrate the same—FIG. 12 showing one pallet/top frame combination while FIG. 13 shows many stacked together for simple transportation and handling. With reference to FIG. 12, it will be seen that the relieved portions 66 on the top frame accommodate posts 71 and 72 on the pallet. Thus, such posts provide at least two different functions, the function of containing the lower collapsed containers in proper location and the function of later assuring proper registration of the top frame for the container. It will be seen from FIG. 13 that holes 111 are provided in each pallet to accommodate the posts 72 of the lower pallet. (It should be noted that each of the bore holes 111 includes a bushing insert which closes the bores through the board 66 of the pallet.) Moreover, straps 112 are included to maintain the stacked combinations together.

As mentioned at the beginning of the detailed description, applicant is not limited to the specific embodiment and variations described above. They are exemplary, rather than exhaustive. The claims, their equivalents and their equivalent language define the scope of protection.

What is claimed is:

1. In a method of packaging commodities, the steps of:
   A. furnishing to a handler of said commodities, a plurality of collapsible plastic containers for such commodities, said containers configured to hold said commodities when erected but being furnished to said handler in their collapsed conditions;
   B. separately furnishing to said handler one or more first pallets configured to hold a stack of said plastic containers in their erected conditions; and
   C. wherein said step of furnishing said containers in their collapsed conditions includes furnishing the same on a second pallet having interface structure to position at least one of said containers while in its collapsed condition on said second pallet.

2. The method of claim 1 wherein said step of separately furnishing includes also furnishing to said handler, a top frame for cooperation with a corresponding one of said first pallets to secure a stack of said plastic containers in their erected conditions on said pallet.

3. The method of claim 1 wherein said step of furnishing a plurality of said containers in said collapsed conditions includes furnishing the same in a stacked relationship with said containers nested to prevent transverse movement of a collapsed container relative to adjacent ones.

4. The method of claim 1 wherein each of said separately furnished first pallets has interface structure to position said stack of erected containers.

5. The method of claim 1 wherein said containers are made of essentially the same plastic as said first pallets are made.

6. The method of claim 1 wherein said step of furnishing said containers in their collapsed conditions comprises furnishing said containers in a generally flat and nested condition on said pallet.

7. The method of claim 1 wherein each of said separately furnished first pallets includes interface structure to position said stack of erected containers, and said first and second pallets are generally of the same construction except for the interface structures of both of said first and second pallets.

8. The method of claim 7 in which said interface structure of said first pallets which are separately furnished includes opposed guide rails which interface with the lowermost container of a stack of said erected containers placed on a selected one of said first pallets, and said interface structure for said second pallet includes protruding posts which position a collapsed container on said second pallet.

9. A packaging arrangement for commodities comprising the combination of:
   A. a plurality of plastic containers for holding said commodities;

B. a first pallet for holding said plurality of said containers in an erected, stacked condition;

C. interface structure in the configuration of said plastic containers for interacting with a pallet;

D. complementary interface structure on said pallet for interacting with the lowermost container of a stack of said containers to be placed on said pallet; and E. said plastic containers also having a collapsed condition for handling and storage when they are not holding said commodities, further including as part of said combination a second pallet for said plastic containers when they are in their collapsed condition and second interface structure on said second pallet for positioning at least one of said containers when it is in its collapsed condition on said second pallet.

10. The combination of claim 9 wherein the plastic materials selected for said plurality of container, said interface structures, and said pallets are all selected to be recyclable.

11. The combination of claim 10 wherein the plastic material selected for each one of the recited elements is the same as the plastic material selected for any other.

12. A packaging arrangement for commodities comprising:

A. a plurality of plastic containers for commodities, each of said containers having an erected condition for holding said commodities and a collapsed condition for handling and storage when it is not holding said commodities;

B. a first plastic pallet configured to hold said plurality of plastic containers in a stacked erected condition;

C. interface structure on said first pallet for positioning the lowermost erected container of said stack on said pallet;

D. a second pallet for said containers in their collapsed conditions; and

E. second interface structure on said second pallet for positioning at least one of said containers when it is in its collapsed condition on said second pallet.

13. The apparatus of claim 12 wherein said containers and said pallet are made from essentially the same plastic material.

14. The apparatus of claim 12 wherein each of said plastic containers includes wall structure projecting from a bottom wall and extending outwardly away from said bottom wall when said container is in said collapsed condition to facilitate access to the inner surface of said bottom wall.

15. The apparatus of claim 14 wherein said containers are configured to nest with one another when in their collapsed condition.

16. In a method of packaging commodities, the steps of:

A. furnishing in their collapsed condition, a plurality of collapsible plastic containers for such commodities to a handler of said commodities, said step of furnishing including
  i. providing a pallet for said containers in their collapsed condition having interface structure for positioning one of said containers in its collapsed condition on said pallet;
  ii. nesting said containers in their collapsed condition together on said pallet; and B. separately furnishing to said handler, one or more other pallets configured to hold a plurality of said plastic containers when stacked in their erected condition.

17. A packaging arrangement for commodities comprising:

A. a plastic container for said commodities, said container having an erected condition for holding said commodities and a collapsed condition for its own handling when it is not holding said commodities;

B. a first pallet for holding a plurality of said containers in a stacked erected condition;

C. interface structure on said first pallet configured to position the lowermost container in a stack of the same on said pallet when said containers are in their erected condition;

D. a second pallet for holding a plurality of said containers when nested together in their collapsed condition; and E. second interface structure on said second pallet configured to position a container in its collapsed condition on said second pallet.

18. The apparatus of claim 17 further including a frame for interacting with said first pallet for maintaining stacked erected containers on said pallet as a unit.

19. The apparatus of claim 17 further including a second frame configured to interact with said second pallet to maintain a plurality of said containers in their collapsed and nested condition on said pallet as a unit.

* * * * *